3,102,899
PREPARATION OF TRANSITION METAL ORGANIC PHOSPHITE COMPLEXES
Lawrence G. Cannell, Berkeley, Calif., assignor to Shell Oil Company, New York, N.Y., a corporation of Delaware
No Drawing. Filed July 22, 1960, Ser. No. 44,556
8 Claims. (Cl. 260—439)

This invention relates to a process for preparing complexes between metals and biphyllic ligands. More particularly, it relates to, and has as its principal object, a process for preparing complexes between transition metals whose valence state has been lowered by the process and biphyllic ligands containing phosphorus, arsenic, or antimony in its trivalent state.

In the past, it has been known to prepare complexes of the foregoing type by a replacement reaction involving a metal carbonyl complex. One or more of the carbonyl molecules may be replaced by an appropriate biphyllic ligand. For example, in the case of nickel tetracarbonyl, one or more of the carbonyl groups may be readily replaced by reacting the nickel carbonyl with a biphyllic ligand that will replace carbonyl groups. At least one major disadvantage in the foregoing method is the difficulty in handling the metal carbonyls. Many of these are highly toxic and volatile. The present process eliminates the necessity for working with these carbonyls.

Another way of preparing transition metal-biphyllic ligand complexes involves dissolving a salt of the transition metal in the biphyllic ligand and hydrogenating the solution. While this is an excellent method of preparation, the process of the present invention proceeds more readily with certain of the transition metals such as nickel. In addition, the present invention has the advantage of permitting the use of an aqueous solvent as a reaction medium. This results in greater convenience and lowered cost.

The complexes formed by the process of this invention have found use for many different purposes. For example, they may be used as gasoline additives, hydrogenation catalysts, and hydroformylation catalysts.

In accordance with the present invention, there is provided a process for lowering the valence state of a transition metal having an atomic number from 23 to 85 and for preparing a complex between it and a biphyllic ligand containing a trivalent atom selected from group VA of the periodic table having an atomic number from 15 to 51, wherein said trivalent atom has one available pair of electrons, which comprises reducing a salt of said transition metal in liquid phase with an alkali metal dithionite, and intermixing said biphyllic ligand with said transition metal.

The term "complex" as used throughout the specification and claims means a coordination compound formed by the union of one or more electronically rich molecules or atoms capable of independent existence with one or more electronically poor molecules or atoms, each of which is also capable of independent existence.

As was discussed above, the complexes prepared by the process of this invention involve transition metals. They are supplied to the process in the form of a salt of the desired metal. Any water-soluble salt of the transition metal to be used in the process will be suitable. In particular, transition metal salts of inorganic and organic acids may be used. The salts of strong, inorganic acids, such as of the hydrohalic acids, salts of weak inorganic acids, such as HCN, and salts of such organic acids as carboxylic acids may be used. Examples of preferred salts are chlorides, bromides, cyanides, nitrates, acetates, propionates, butyrates, and the like. Hydrated salts are equally useful in the process. Although salts of the foregoing monobasic acids are suitable, salts of polybasic acids such as sulfuric, the sulfonic acids, phosphoric, and the phosphonic acids may also be used. Sulfates in particular have been found to be very suitable.

While the salt of any transition metal having an atomic number of from 23 to 85 may be used in the present process, the transition metals of group VIII of the periodic table are preferred. These include iron, cobalt, nickel, ruthenium, rhodium, palladium, osmium, iridium, and platinum. Among the transition metals of group VIII, the transition metals of the fourth period, i.e., iron, cobalt, and nickel, are most preferred. Nickel has been found to be very suitable.

The process lowers the valence state of one of the above transition metals and forms a complex between it and a biphyllic ligand. The valence of the transition metal at the completion of the process will normally be zero or lower, such as the $-1$ valence state. This lowered valence state is one reason for the outstanding stability of the resulting complex.

By "biphyllic ligand" is meant a compound having an element with a pair of electrons capable of forming a coordinate bond with a metal atom and simultaneously having the ability to accept the electrons from the metal, thereby providing additional stability to the resulting complex.

The biphyllic ligand reactants for the present process include those compounds having an arsenic or antimony or phosphorus atom, wherein said atom is trivalent. Of these the biphyllic ligands involving phosphorus are preferred and will therefore be used to illustrate the types of structures that are suitable as biphyllic ligands. It will be understood by those skilled in the art that analogus structures in which the phosphorus atom is replaced by arsenic or antimony will also be suitable.

The preferred biphyllic ligands containing trivalent phosphorus are those in which the phosphorus atom has one available or unshared pair of electrons. Any compound containing trivalent phosphorus with the foregoing electronic configuration is a suitable biphyllic ligand for the catalysts of the present invention. When trivalent phosphorus has such an electronic configuration, it is capable of forming a coordinate bond with the transition metals previously described, and simultaneously has the ability to accept electrons from those metals. It thus will operate as a biphyllic ligand in forming the desired complexes for use as catalysts in the present process.

The three valences of the phosphorus atom may accordingly be satisfied by any organic radical since it is only the presence of the phosphorus atom having an available pair of electrons that is crucial to the formation of the complex with the transition metal. Consequently organic radicals of any size and composition may be bonded to the phosphorus atom. Contemplated within the scope of this invention therefore are trivalent phosphorus compounds having aliphatic, and/or cycloaliphatic, and/or heterocyclic, and/or aromatic radicals satisfying its three valences. These radicals may contain any functional group such as the carbonyl, carboxyl, nitro, amino, hydroxyl functional groups, saturated or unsaturated carbon-to-carbon linkages, as well as saturated and unsaturated non-carbon-to-carbon linkages.

It is also suitable for an organic radical to satisfy more than one of the valences of the phosphorus atom, thereby forming a heterocyclic compound with a trivalent phosphorus atom. For example, an alkylene radical may satisfy two phosphorus valences with its two open valences and thereby form a cyclic compound. Another example would be the alkylene dioxy radical to form a cyclic compound where oxygen atoms link an alkylene radical to the phosphorus atom. In these two examples, the third phosphorus valence may be satisfied by any other organic radical.

Another type of structure involving trivalent phosphorus having an available pair of electrons are those containing a plurality of such phosphorus atoms linked by organic radicals. This type of a compound is called a bidentate ligand when two such phosphorus atoms are present, a tridentate ligand when three such phosphorus atoms are present, and so forth. Examples of these polydentate ligands include such structures as

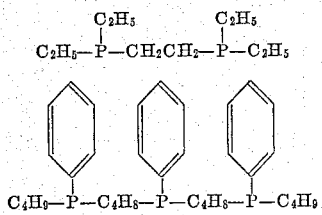

and the like.

Certain of the suitable biphyllic ligands described above are of particular interest. When these are employed the process provided by this invention may be described as a process for lowering the valence state of a transition metal having an atomic number from 23 to 85 and for preparing a complex between it and a biphyllic ligand having the formula $$(R_wZ)_x\text{—}L\text{—}R'_y$$

wherein L is an atom of group VA of the periodic table having an atomic number from 15 to 51, R and R' are each members of the class consisting of the alkyl, aryl, alkaryl, and aralkyl radicals, Z is an atom selected from the group consisting of the oxygen, sulfur, and nitrogen atoms, $w$ is an integer from 1 to 2 equal to the valence of Z minus one, $x$ and $y$ are integers whose sum is equal to 3, which comprises reducing a salt of said transition metal in liquid phase with an alkali metal dithionite, and intermixing said biphyllic ligand with said transition metal. It should be noted that either $x$ or $y$ in the above formula may be equal to zero and still fit the definition given. The atoms of group VA of the periodic table are those as shown in Handbook of Chemistry and Physics, 40th Ed., pp. 448–449 (Chemical Publishing Company).

The preferred phosphorus compounds of particular interest as ligands in the present process in accordance with the foregoing formula therefore include oxygen-containing esters and thioesters of trivalent phosphorus such as phosphites and thiophosphites, amides of trivalent phosphorus such as amidophosphites, as well as phosphorus compounds having combinations of the foregoing three types of substituent groups. Oxygen-containing esters are preferred substituents on the trivalent phosphorus atom. Each ester portion of the molecule preferably contains a hydrocarbon radical having no more than 20 carbon atoms. Similarly, each amido portion of the molecule preferably contains two hydrocarbon radicals substituted on the nitrogen atom, each having no more than 20 carbon atoms. Most preferably, the hydrocarbon radical is an alkyl radical such as an ethyl group, an aryl radical such as a phenyl or naphthyl group, an alkaryl radical such as a tolyl group, or an aralkyl radical such as a phenylethyl group. Trialkyl phosphites have been found to be most suitable biphyllic ligands for the purposes of this invention.

Instead of oxygen-containing esters or thioesters or amides of trivalent phosphorus, suitable biphyllic ligands involving phosphorus include those wherein substituents such as those described as the hydrocarbon radicals of the ester portion of the above-described phosphorus esters, are directly joined to the phosphorus atom. This type of a compound is properly termed a phosphine. As with the phosphites discussed above, trialkyl phosphines are a most suitable group of biphyllic ligands for the purposes of this invention.

Another group of suitable biphyllic ligands involving phosphorus would be those formed by satisfying the valence bonds of the phosphorus atom by combination of the above-described groups. For example, a trivalent phosphorus atom may have substituted upon it one alkyl group and two alkoxy groups, or it may have one alkylthio group and two dialkyl amino groups. The large number of possible different combinations of substituents upon the phosphorus atom will be obvious. Generally, in the case of trivalent phosphorus, these compounds will be termed phosphinites where the molecule contains one oxygen atom linking a substituent group to the phosphorus atom, and phosphonites where the molecule contains two oxygen atoms, each of which links a substituent group to the phosphorus atom. The term "thio" is of course used when sulfur is present in place of oxygen, while the term "amido" is used when nitrogen is present in place of oxygen.

Specific examples of transition metals and biphyllic ligands suitable for use in the present process include the following:

| Transition metal | Biphyllic ligand |
| --- | --- |
| Vanadium | Tributyl phosphite. |
| Cobalt | Triphenyl thiophosphite. |
| Nickel | O,O-dimethyl phenyl thiophosphite. |
| Rhenium | O,O-dimethyl-2,6-dimethylphenyl phosphonite. |
| Iron | O-ethyl-bis(β-phenyl ethyl)phosphinite. |
| Osmium | O,O-deicosyl methyl thiophosphite. |
| Rhodium | Triethyl phosphite. |
| Chromium | Trimethylphosphine. |
| Molybdenum | Tripentylphosphine. |
| Palladium | O-methyl diphenyl phosphinite. |
| Platinum | Tripropylphosphine. |
| Cobalt | triphenylphosphine. |
| Nickel | Tris(diethylamino)phosphite. |
| Iron | dimethylamino dimethyl thiophosphite. |
| Cobalt | Dibutyl amino diethyl phosphinite. |
| Vanadium | Tributyl arsenite. |
| Nickel | O,O-dimethyl phenyl thioarsenite. |
| Iron | O-ethyl-bis(β-phenyl ethyl) arsinite. |
| Rhodium | Triethyl arsenite. |
| Chromium | Trimethylarsine. |
| Molybdenum | Triphenylarsine. |
| Palladium | O-methyl diphenyl arsinite. |
| Platinum | Tripropylarsine. |
| Nickel | Tris(diethylamino)arsenite. |
| Iron | Dimethylamino dimethyl thioarsenite. |
| Cobalt | Dibutyl amino diethyl arsinite. |
| Vanadium | Tributyl stibenite. |
| Nickel | O,O-dimethyl phenyl thiostibenite. |
| Iron | O-ethyl-bis(β-phenyl ethyl) stibinite. |
| Rhodium | Triethyl stibenite. |
| Chromium | Trimethylstibine. |
| Molybdenum | Triphenylstibine. |
| Palladium | O-methyl diphenyl stibinite. |
| Platinum | Tripropylstibine. |
| Nickel | Tris(diethylamino)stibenite. |
| Iron | Dimethylamino dimethyl thiostibenite. |
| Cobalt | Dibutyl amino diethyl stibinite. |

It is possible to prepare a mixed complex if, in addition to using any of the above-described suitable biphyllic ligands, carbon monoxide gas is added to the reaction mixture. The resulting complex will then be a transition metal held in complex combination with one or more of the above biphyllic ligands and one or more carbon monoxide molecules. The number of molecules of each type of ligand that will be present in the final complex will be determined by controlling the quantities of reactants employed. For example, nickel complexes with four ligand molecules. If two moles of, for example, triethyl phosphite per mole of nickel are employed, along with an excess of carbon monoxide gas, the resulting complex will contain one mole of nickel complexed with two moles of triethyl phosphite and two carbon monoxide molecules.

The process of this invention is carried out by reducing the transition metal of one of the above salts in liquid phase with an alkali metal dithionite, and intermixing a biphyllic ligand of the type mentioned above at a temperature and pressure sufficient for appreciable product formation.

The pressure and temperature of the system may be varied over a considerable range and still achieve the desired product. The particular metal chosen and particular ligand utilized will usually be the most important factor in governing the precise conditions to be used for optimum results. It has been found that a temperature of from about 0° C. to about 150° C. has been successful. While both super- and subatmospheric pressures may be used if desired, it is preferred to use atmospheric pressure for convenience. Generally, under the foregoing conditions, there will be an appreciable amount of product formed within one hour or less.

Any alkali metal dithionite may be used as the reducing agent. For example, the potassium, sodium, or rubidium dithionites are all suitable, sodium dithionite being preferred.

The complex may be prepared from any mole ratio of the reactants that will result in an appreciable amount of complex formation. A stoichiometric excess of the ligand over the transition metal salt will in general produce the desired results and is preferred, although smaller proportions of the ligand may be used if desired. Mole ratios of ligand to metal from less than 10/1 to over 50/1 may be used with good results. The dithionite should be present in at least the stoichiometric amount required for reduction of the transition metal to the desired valence state.

The reactants may be combined in any desired order. Thus it is possible to reduce the transition metal with the dithionite and thereafter add the biphyllic ligand to produce the desired complex, or all of the reactants may be combined at the outset. In any case the process is conducted in liquid phase. It is possible to use an excess of the ligand as solvent for the reaction if the particular ligand being employed is a satisfactory solvent for the other reactants. Otherwise any inert solvent may be used. In addition, in the case of slightly water-soluble ligands, solvents mutually miscible with water may be used to assist solution. Specific examples may be pyridine, dimethyl formamide, methanol, acetone, dioxane, and 1,2-dimethoxyethane. As was previously pointed out, one of the advantages of this process is its ability to be carried out in water. It is desirable when using water, to add another component to the solvent so that the transition metal will remain in solution and not be precipitated out. For this purpose, the addition of ammonia to water has been found to be extremely satisfactory since the ammonia has the ability to complex with metals and keep them in solution until they complex with the biphyllic ligands. Other complexing agents are cyanide, acetate, and thiocyanate.

It has also been found that an alkaline medium, i.e., one having a pH greater than 7, is very desirable. The alkaline medium tends to prevent decomposition of dithionite to sulfur. It also promotes the effect of the dithionite as a reducing agent, hastening the reaction rate and increasing yield. It is therefore preferred to carry out the reaction in an aqueous alkaline solution. When using ammonia as mentioned above, not only has it been found advantageous in holding the reduced transition metal in solution, but it has also been found to be advantageous in maintaining alkalinity in the solution. Therefore, ammoniacal aqueous solutions are preferred as a solvent. Other bases or buffers such as acetate buffers may be added to water to create an alkaline medium if desired, but they will generally lack the other advantage of ammonia.

The process is best illustrated by the following examples utilizing typical transition metals and typical biphyllic ligands. It is to be understood that these examples are offered for illustrative purposes only and are not to be construed as limiting the invention in any respect.

*Example I.—Preparation of Tetrakis(Triethyl Phosphite)Nickel(0)*

A 3-necked round-bottomed one-liter flask was equipped with a stirrer, dropping funnel (having a pressure-equalizing side arm) and a condenser. The system was swept out with nitrogen passing through the condenser and out of the dropping funnel. The nitrogen sweep was also used to exclude air at the time of addition of reactants. After addition of reactants, the dropping funnel was stoppered, and nitrogen by-passed the system at a T-tube placed upstream from the condenser.

Into the flask was placed a solution of 13.8 grams (0.05 mole) of $NiSO_4 \cdot 6H_2O$ in 400 ml. of water and 60 ml. of concentrated (28% w.) aqueous ammonia solution. Triethyl phosphite (100 grams, 0.61 mole) was added and formed a layer on top of the aqueous phase. A sodium dithionite solution (12.5 grams of $Na_2S_2O_4$ in 50 ml. of water and 30 ml. of concentrated ammonia solution) was then added over a 20-minute period with stirring. The solution was initially a dark-blue color but became a very dark blue-black upon addition of the reducing agent. When addition of the dithionite solution was complete, the mixture was heated to 90° C. in about 30 minutes and then cooled. The reaction mixture was gray in color with the organic phase being darker. Subsequent workup of the mixture showed that the color was due to a very small amount of suspended black solid (Ni metal or NiS). The volume of the organic phase diminished by at least one-half, and it appeared that some of the phosphite ester had undergone hydrolysis.

Isopentane (ca. 100 ml.) was added to the cool reaction mixture, and the organic and aqueous phases separated. The organic phase was washed four times with water, dried over "Drierite" and filtered. Upon chilling over "Dry Ice" white crystals separated (wt., 5 grams); a second crop was obtained over isopentane removal and chilling (17.8 grams). Removal of all isopentane was assured by evacuation in a desiccator. The material is best handled in a nitrogen atmosphere; exposure to air turns the material yellow and finally to a green liquid. The total weight of 22.8 grams represented a 63% yield of tetrakis(triethyl phosphite)nickel(0) based on $NiSO_4$.

| $C_{24}H_{60}P_4O_{12}Ni$ | C | H | P | Ni |
|---|---|---|---|---|
| Calculated | 39.9 | 8.4 | 17.1 | 8.1 |
| Found | 40.6 | 8.5 | 17.1 | 8.0 |

*Example II.—Synthesis of Cobalt-Triethyl Phosphite Complex*

Six grams (0.05 mole) of cobalt carbonate was dissolved in a mixture of 15 ml. of 6 N $H_2SO_4$ and 100 cc. of water. 290 cc. of water and 65 cc. of concentrated $NH_3$ solution were then added. The entire solution was then placed in a 3-necked 1-liter flask fitted with a stirrer, dropping funnel and nitrogen inlet. The system was flushed with nitrogen. A separate solution of 14 grams of $Na_2S_2O_4$ in a mixture of 100 cc. of water and 37½ cc. concentrated $NH_3$ was placed in the dropping funnel while nitrogen was allowed to flow up through the side arm and out of the funnel. Upon addition of the $Na_2S_2O_4$ solution with stirring the reaction mixture turned a very dark red. 100 grams of triethyl phosphite were added, and the reaction mixture stirred for 30 minutes. No observable change occurred. The dropping funnel was replaced with a reflux condenser and the mixture heated with a heating mantle at 50–70° C. for about an hour, during which time the mixture became a light yellow color. The mixture was cooled and 200 cc. of isopentane were added. After stirring, the water and isopentane layers were allowed to separate and the pentane layer was removed by pipetting. The extraction was repeated twice with 150 cc. portions of isopentane, and the isopentane extracts were dried with magnesium sulfate and decolorized with carbon under a nitrogen atmosphere. Most of the isopentane was then removed with a steam bath and nitrogen stream. The remaining solution was chilled in Dry Ice. Yellow crystals formed and were separated under nitrogen. The product weighed 22 grams. The product was substantially identical to hydrogen tetrakis(triethyl phosphite) cobaltate(-I).

*Example III.—Tricresyl Phosphite-Nickel Complex— Preparation*

The same apparatus was employed as in Example I. Into the 1-liter round-bottomed flask was placed $NiSO_4 \cdot 6H_2O$ (13.8 grams, 0.05 mole) dissolved in 400 ml. of water and 60 ml. of concentrated aqueous ammonia. Under a nitrogen atmosphere 12.5 grams of 90° $Na_2S_2O_4$ in 50 ml. of water and 30 ml. of concentrated ammonia was added with stirring. After the mixture had turned a dark black-blue, tricresyl phosphite (144 grams, 0.40 mole) was added with stirring. The mixture was stirred for 1 hour at room temperature, allowed to stand for 45 minutes, and then heated with stirring for 1 hour at about 50° C. A small amount of dark solid nickel sulfide separated, and the solution returned to a blue color characteristic of aqueous ammoniacal Ni(II); an organic phase, heavier than water, was also present. Additional $Na_2S_2O_4$ (5 grams) in 15 ml. of water and 7 ml. of concentrated ammonia was added to reduce the remaining Ni(II). The aqueous solution again turned dark blue-black and then on stirring for 5 minutes turned a very light brown. The organic phase was separated from the aqueous layer by transfer to a separatory funnel, washed four times with water, and filtered with suction to remove suspended black solid. The light yellow organic phase was quite viscous, so for further manipulation it was dissolved in twice its volume of isopentane. The solution was washed six times with water and dried over "Drierite." The isopentane was removed at reduced pressure in a rotary evaporator at 44° C.; and the lighter boiling material (tricresyl phosphite) was removed by passing twice through a falling film molecular still at 110° C. and $5 \times 10^{-4}$ mm. of Hg. The weight of product, light yellow in color, was 35 grams. It reacted only slowly with air by turning black after one week's exposure. Analysis showed the product contained 2.1% Ni and 8.4% P.

I claim as my invention:

1. A process for preparing a complex between a transition metal having an atomic number from 26 to 28, inclusive, and a trihydrocarbon phosphite, wherein the hydrocarbon groups contain from 1–20 carbon atoms, which comprises reacting a salt of the transition metal in liquid phase with an alkali metal dithionite to reduce the valence state of the transition metal, and reacting it with the phosphite.

2. A process in accordance with claim 1, wherein the trihydrocarbon phosphite is trialkyl phosphite.

3. A process in accordance with claim 2 wherein said trialkyl phosphite and said transition metal are reacted in the presence of carbon monoxide gas, whereby the complex prepared contains a carbon monoxide molecule in addition to the trialkyl phosphite molecule.

4. A process in accordance with claim 2 wherein said liquid phase is an aqueous ammoniacal solution.

5. A process in accordance with claim 2 wherein said reaction with the phosphite is accomplished prior to the reduction of the transition metal.

6. A process for preparing a complex between nickel and triethyl phosphite which comprises reacting a nickel salt in an aqueous ammoniacal solution with triethyl phosphite and sodium dithionite to reduce the valence state of the nickel.

7. A process for lowering the valence state of cobalt and for preparing a complex between it and triethyl phosphite, which comprises reacting a cobalt salt in an aqueous ammoniacal solution with sodium dithionite to reduce the valence state of the cobalt, and subsequently reacting the reduced cobalt with triethyl phosphite.

8. A process for lowering the valence state of nickel and for preparing a complex between it and tricresyl phosphite, which comprises reacting a nickel salt in an aqueous ammoniacal solution with sodium dithionite to reduce the valence state of the nickel, and subsequently reacting the reduced nickel with tricresyl phosphite.

References Cited in the file of this patent

UNITED STATES PATENTS 2,767,082     Roy et al. _____ Oct. 16, 1956

OTHER REFERENCES

Malatesta et al.: Journal of the Chemical Society, pages 1186–1188 (1957).

Malatesta et al.: Journal of the Chemical Society, pages 2323–2328 (1958).